US009535574B2

(12) United States Patent
Ozcelik

(10) Patent No.: US 9,535,574 B2
(45) Date of Patent: Jan. 3, 2017

(54) INFINITE SCROLLING A VERY LARGE DATASET

(71) Applicant: Jive Software, Inc., Portland, OR (US)

(72) Inventor: Mehmet Volkan Ozcelik, Mountain View, CA (US)

(73) Assignee: Jive Software, Inc., Palo Alto, CA (US)

( * ) Notice: Subject to any disclaimer, the term of this patent is extended or adjusted under 35 U.S.C. 154(b) by 711 days.

(21) Appl. No.: 13/931,587

(22) Filed: Jun. 28, 2013

(65) Prior Publication Data

US 2015/0007108 A1   Jan. 1, 2015

(51) Int. Cl.
*G06F 3/14*     (2006.01)
*G06F 3/0482*   (2013.01)
*G06F 3/0485*   (2013.01)

(52) U.S. Cl.
CPC ........... *G06F 3/0482* (2013.01); *G06F 3/0485* (2013.01)

(58) Field of Classification Search
CPC ..................................... G06F 3/14; G06F 3/17
USPC ................................ 715/810; 705/26.1, 26.7
See application file for complete search history.

(56) References Cited

U.S. PATENT DOCUMENTS

| | | | |
|---|---|---|---|
| 8,407,110 B1 * | 3/2013 | Joseph ............... | G06Q 30/0633 705/26.1 |
| 2014/0046794 A1 * | 2/2014 | Vallery .............. | G06Q 30/0631 705/26.7 |

OTHER PUBLICATIONS iPhone Development 101: UITableView, visited Jun. 26, 2013, 6 pages.
*Document Object Model (DOM) Level 1 Specification*, Version 1.0, W3C Recommendation, Oct. 1, 1998, 169 pages.
Anthony, "Infinite Scrolling Best Practices," UX Movement, Dec. 23, 2010, 9 pages.
"Infinite Scroll: The Interaction Design Pattern," infinite-scroll.com website, Sep. 25, 2008, 10 pages.
"UITableView Class Reference," iOS Developer Library, visited Apr. 16, 2013, available at http://developer.apple.com/library/ios/#documentation/UIKit/Reference/UITableView_Class/Reference/Reference.html, 44 pages.
Window.requestAnimationFrame, Mozilla Developer Network, visited Apr. 16, 2013, available at https://developer.mozilla.org/en-US/docs/DOM/window.requestAnimationFrame, 3 pages.
"When does JavaScript trigger reflows and rendering?" available at http://mir.aculo.us/2010/08/17/when-does-javascript-trigger-reflows-and-rendering/, Aug. 17, 2010, 2 pages.
"Rendering: repaint, reflow/relayout, restyle," Stoyan's blog, available at www.phpied.com/rendering-repaint-reflowrelayout-restyle/, Dec. 17, 2009, 22 pages.

(Continued)

*Primary Examiner* — Ruay Ho
(74) *Attorney, Agent, or Firm* — Klarquist Sparkman, LLP

(57) ABSTRACT

Scrolling of a large number of list items can be supported without degradation in performance. Instead of continually moving list items into an actively laid out representation of the list items, list items can be moved in and out of the actively laid out representation as scrolling progresses. Management of the actively laid out representation can be performed transparently to a user to maintain the impression that the total list is present. List items can be grouped into page units, which can be managed to keep a constant number of page units present in the actively laid out representation. Further enhancements can be accomplished by storing some list items remotely.

20 Claims, 13 Drawing Sheets

(56) References Cited

OTHER PUBLICATIONS

".appendChild Vs jQuery.append( ), Revision 5 of this test case created on Oct. 30, 2012," jsPerf—JavaScript performance playground, available at http://jsperf.com/native-appendchild-vs-jquery-append/5, Oct. 30, 2012, 3 pages.
"Order of Magnitude," Wikipedia, visited Apr. 16, 2013, 5 pages.
"How JavaScript Event Delegation Works," The David Walsh Blog, available at http://davidwalsh.name/event-delegate, visited Apr. 16, 2013, 7 pages.
"Document Object Model," Wikipedia, visited Apr. 16, 2013, 5 pages.
Avins et al., "The Making of Fastbook: An HTML5 Love Story," sencha.com blog, Dec. 17, 2012, 24 pages.
"Infinity.js," airbnb.github.io website, visited Jun. 17, 2013, 3 pages.

\* cited by examiner

```
<html>
  ▶ <head>
  ▼ <body>
        <h2>Mobile Infinite Scroll Test</h2>
     ▼ <div id="MasterContainer">
        ▼ <div id="MasterContainer_MasterPages">
              <div style="height: 0px;"></div>
           ▼ <div>
              ▶ <div data-page-id="0">
              ▶ <div data-page-id="1">
              ▶ <div data-page-id="2">
              </div>
              <div style="height: 901370px;"></div>
              <div id="MasterContainer_MasterTest"></div>
           </div>
        </div>
     ▶ <script src="main.js">
     </body>
</html>
```

900

FIG. 9

```
<html>
  ▶ <head>
  ▼ <body>
      <h2>Mobile Infinite Scroll Test </h2>
      ▼ <div id="MasterContainer">
          ▼ <div id="MasterContainer_MasterPages">
              <div style="height: 21760px;"> </div>
            ▼ <div>
                ▶ <div data-page-id="1">
                ▶ <div data-page-id="2">
                ▶ <div data-page-id="3">
              </div>
              <div style="height: 879706px;"> </div>
              <div id="MasterContainer_MasterTest"> </div>
            </div>
          </div>
      ▶ <script src="main.js">
    </body>
</html>
```

1000

FIG. 10

```
<html>
  ▶ <head>
  ▼ <body>
      <h2>Mobile Infinite Scroll Test</h2>
    ▼ <div id="MasterContainer">
        ▼ <div id="MasterContainer_MasterPages">
            <div style="height: 217331px;"></div>
          ▼ <div>
              ▶ <div data-page-id="10">
              ▶ <div data-page-id="11">
              ▶ <div data-page-id="12">
            </div>
            <div style="height: 684154px;"></div>
            <div id="MasterContainer_MasterTest"></div>
          </div>
        </div>
      ▶ <script src="main.js">
    </body>
</html>
```

1100 

FIG. 11

INFINITE SCROLLING A VERY LARGE DATASET

BACKGROUND

Lists of information are pervasive in modern computing. Such lists can present information for any of a variety of reasons related to business computing, social networking, or the like. And, given the increasing availability of storage space and computing power, the size of such lists can grow to large proportions. For example, it is not unusual to have a list with thousands, hundreds of thousands, or even more items. While storing such lists is typically not a problem, presenting them is.

It is well known to display only part of a list and allow a user to scroll within the list to see additional content. However, the mechanisms for doing so were typically not designed to handle very large lists. For example, in a web scenario, items on a web page are typically stored as part of a Document Object Model ("DOM"). Because recurring processing is performed on items the DOM, if the DOM contains a large number of items, resources can be consumed to the point where presentation of the list becomes nonresponsive, slow, or freezes. There is therefore room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

A variety of technologies supporting scrolling a very large dataset are described herein. When an indication to scroll a displayed list of list items is received, which of the list items are maintained in an actively laid out representation can be updated. One or more dummy placeholders can be adjusted (e.g., to occupy space vacated by list items moved out of the actively laid out representation).

Because all list items are not maintained in the actively laid out representation, performance and resource conservation can be significantly enhanced.

The technologies can be applied in a wide variety of scenarios and used across a wide variety of devices.

As described herein, a variety of other features and advantages can be incorporated into the technologies as desired.

BRIEF DESCRIPTION OF THE DRAWINGS

FIGS. 9, 10, 11 are snapshots of elements in an actively laid out representation of list items during execution of the technologies.

DETAILED DESCRIPTION

Example 1

Exemplary Overview

The technologies described herein can be used for infinite scrolling of a very large data set. Adoption of the technologies can provide techniques for implementing such scrolling while maintaining acceptable performance.

The technologies can be helpful for those wishing to support scrolling for very large lists across a variety of device types, including mobile devices. Beneficiaries include those wishing to host web sites or other portals with scrollable lists with a large number of list items. Users can also benefit from the technologies because they can interact with very large data sets without suffering performance degradation.

Example 2

Exemplary System Implementing Infinite Scrolling of a Very Large Data Set

Figure 1:
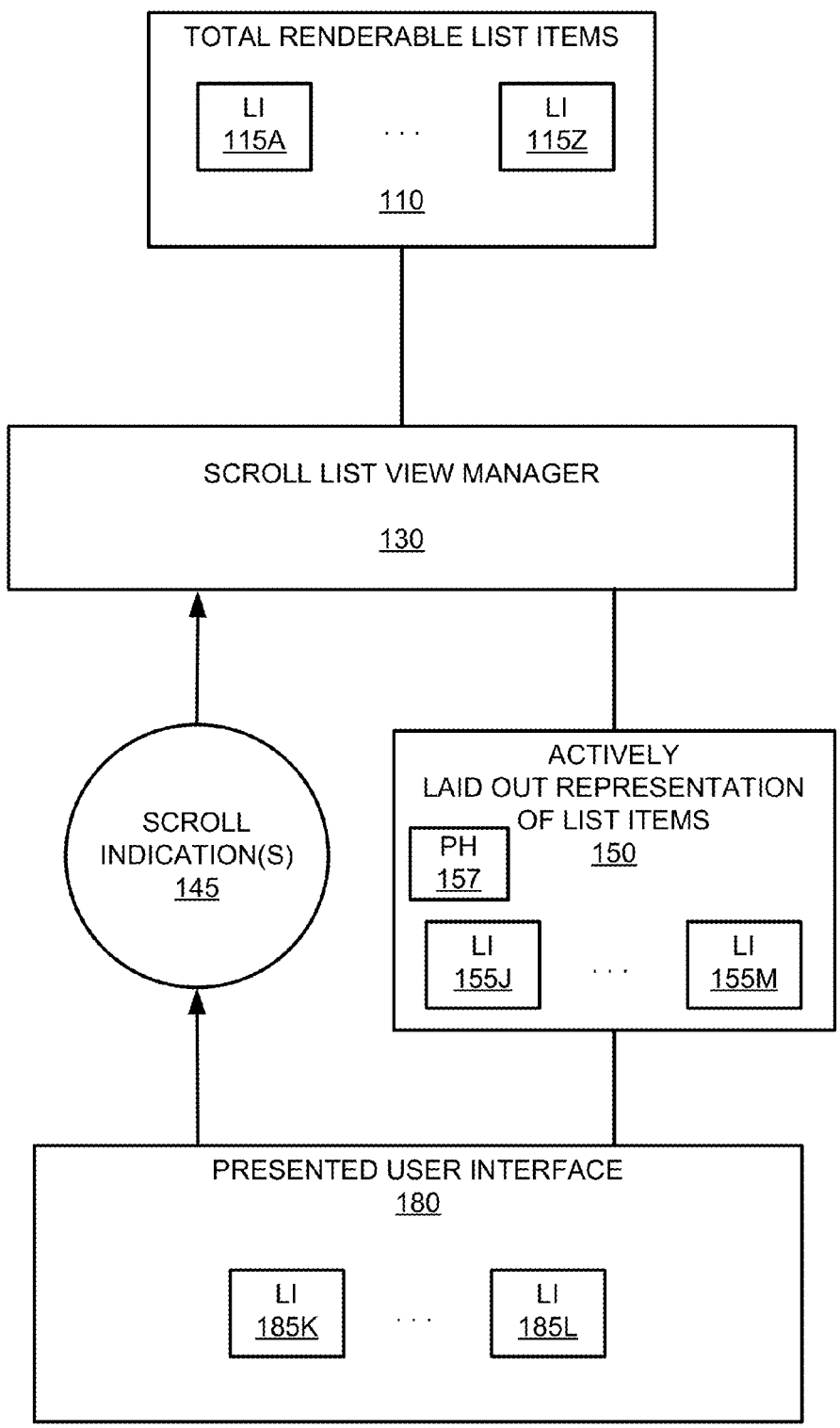
FIG. 1 is a block diagram of an exemplary system implementing infinite scrolling of a very large data set.

FIG. 1 is a block diagram of an exemplary system 100 implementing infinite scrolling of a very large data set as described herein. In the example, the data set comprises a list 110 of total renderable list items 115A-Z. Although the system 100 can be implemented on a single device, such as a mobile device or mobile phone, some of the renderable list items 110 can be persisted remotely as described herein. Thus, the total list items 110 can be completely persisted to the device, or only a subset of them can be persisted (e.g., some can be persisted remotely at a server).

A scroll list view manager 130 can be responsible for managing an actively laid out representation 150 of the renderable list items, which is a subset 155J-M of the total list items 110. One or more dummy placeholders 157 can also be managed by the scroll list view manager 130. As described herein, in the representation 150, a first placeholder can represent renderable list items before the subset 155J-M of the total list items, and a second dummy placeholder can represent renderable list items after the subset 155J-M of the total list items.

A subset 185K-L of the actively laid out representation of the list items can be presented as part of the presented user interface 180 (e.g., in a viewport of a computing device).

The scroll list view manager 130 can receive scroll indications 145 as a result of a user's scrolling within the presented user interface 180.

In practice, the presented user interface 180 can be a web page, web view, or the like. Actual rendering of the presented user interface can be carried out by a rendering engine (not shown), such as an HTML renderer, web browser, or other markup language presentation engine.

The system 100 can be described as a single, unified system, or one or more client systems and one or more server systems. For example, the scroll list view manager engine 130 can interact with additional systems, such as a remote server, an operating system, or the like.

In practice, the systems shown herein, such as system 100 can vary in complexity, with different functionality, components of differing complexity, and the like. For example, differing levels of cache or temporary storage, storing by reference, storing metadata, or the like can be supported.

The system 100 and any of the other systems described herein can be implemented in conjunction with any of the hardware components described herein, such as the computing systems described below (e.g., processing units, memory, and the like). In any of the examples herein, the inputs, outputs, engines, and list items can be stored in one or more computer-readable storage media or computer-readable storage devices. The technologies described herein can be generic to the specifics of operating systems or hardware and can be applied in any variety of environments to take advantage of the described features.

Client/server operation can be supported, and cloud computing techniques can be applied to give clients the ability to perform the described techniques via a local application without concern over the actual computing infrastructure needed or used to operate the servers, which can be administered by a business entity different from the client user organization.

Example 3

Exemplary Method Implementing Infinite Scrolling of a Very Large Data Set

Figure 2:
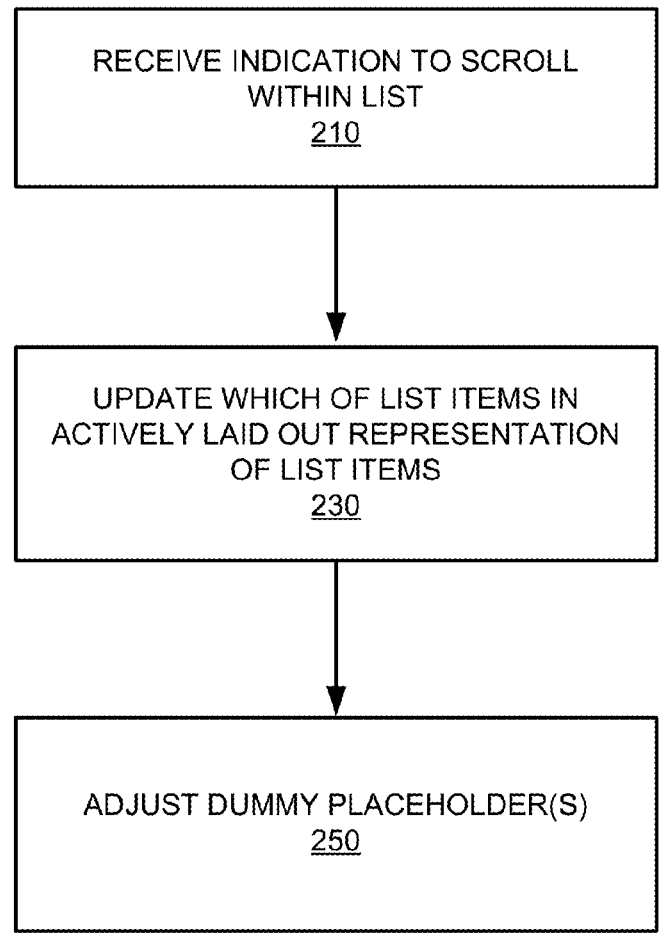
FIG. 2 is a flowchart of an exemplary method of implementing infinite scrolling of a very large data set.

FIG. 2 is a flowchart of an exemplary method 200 of implementing infinite scrolling of a very large data set and can be implemented, for example, in the system shown in FIG. 1. The method 200 can be performed as part of an infinite scrolling scenario as described herein.

As the method 200 is performed, rather than storing all of the total renderable list items in the actively laid out representation of the list items, only a proper subset of the total list items can be stored in the actively laid out representation of the list items. Management of the actively laid out representation of the list items can be performed as described herein to prevent the actively laid out representation from becoming unmanageable. Thus, instead of constantly growing during scrolling, the actively laid out representation can be maintained at a substantially constant size (e.g., of nodes) by moving content out as described herein.

At 210, an indication to scroll within a displayed list of the renderable list items out of the total list is received. As described herein, such an indication can involve scroll events that are received as a result of a user's scrolling the list items displayed within a presented user interface. As described herein, the list items can have different sizes.

At 230, responsive to receiving the indication to scroll within the list, which of (e.g., which ones of, which instances of, etc.) the total renderable list items that are maintained in an actively laid out representation of list items can be updated. For example, renderable list items from the total renderable list items can be moved into the actively laid out representation. Also, a plurality of renderable list items already in the actively laid out representation can be moved out (e.g., removed) therefrom.

In practice, various other conditions can be checked and satisfied before performing the update 230. For example, it can be determined that remaining list items in the actively laid out representation are becoming depleted. And, the updating need not be performed directly responsive to a scroll event. For example, the updating can be performed further responsive to conditions such as whether the user has finished scrolling, the timing of the animation of the scrolling, or the like.

At 250, one or more dummy placeholders can be adjusted as described herein. For example, space vacated by list items moved out of the actively laid out representation of the renderable list items can be occupied with a dummy placeholder. The space vacated can be equal to a combined size of the plurality of list items moved out. The dummy placeholder can thus be grown by a size equal to a combined size of the list items moved out.

When list items are moved into the actively laid out representation of list items, a dummy placeholder can be reduced in size to account for the space occupied by the list items moved in. The dummy placeholder can be reduced in size equal to the size of the list items moved in.

A placeholder may have a size of zero for cases where there is no space to be occupied (e.g., when scrolling has reached the beginning or end of the total list items).

The list items in the actively laid out representation of list items in the viewport can then be displayed (e.g., on a display of a hardware device). In practice, such displaying can be performed by a rendering engine as described herein.

At some point, scrolling may go in a different direction. For example, a user can scroll back to content previously viewed. In such a case, if a list item was removed from the actively laid out representation, it can be moved back in.

The method 200 and any of the other methods described herein can be performed by computer-executable instructions (e.g., causing a computing system to perform the method) stored in one or more computer-readable media (e.g., storage or other tangible media) or stored in one or more computer-readable storage devices.

Example 4

Exemplary Infinite Scrolling

In any of the examples herein, an infinite scrolling scenario can be supported when presenting list items in a user interface. In an infinite scrolling scenario, rather than presenting list items as belonging to pages through which a user must navigate, the user interface presents a single page on which any of the total list items can be viewed. Such an approach can be favorable because it avoids additional navigation actions to navigate from page to page. Instead, a user can simply scroll within the list to the items desired. Although the word "infinite" is used, in practice there is a finite number of list items.

To preserve the illusion that the total list items are present in the list, the placeholders described herein can be grown or shrunk within the actively laid out representation of the list items. In reality, only a subset of the list items are in the actively laid out representation. However, the apparent size of the list will be correct, thus the position of scroll boxes or other scroll position indicators can continue to provide a visual cue as to relative location within the total list items.

Example 5

Exemplary Scrolling

In any of the examples herein, scrolling can include any of a variety of scrolling or scroll-like user interface interaction activities. Such activities can be accomplished with a pointing device, mouse, trackball, keyboard, scroll wheel, gestures, reorientation or tilt of screen, or the like. For example, movement of a list of items can be accomplished by swiping or flicking the displayed list. Although traditional two-dimensional scrolling is supported, implementations can also support three-dimensional spatial scrolling (e.g., of data cubes, information cubes, etc.) or the like. Scrolling can be implemented in response to an indication of which items displayed in the viewport are to be displayed (e.g., where in the total list the viewport resides). Reorientation or tilting of a device (e.g., from landscape to portrait) can also result in scrolling because the number of items shown can change.

Thus, although the terms "scroll event" and the like are used, other similar events can be supported.

Example 6

Exemplary Renderable List Items

In any of the examples herein, a renderable list item (or "list item") can take the form of content items presented as part of a list. In practice, such list items can contain text, graphics, photographs, icons, emoticons, or the like. For example, in a web-based environment, list items can take the form of blog or other posts, logs, history items, comments, running commentaries, or the like.

Such list items typically have an order, so they can be processed as consecutive. However, the order may vary depending on situation (e.g., oldest first, newest first, most popular first, or the like). The items may take on a hierarchical nature. For example, a response to a comment can be stored as a child of the comment, and so forth.

Due to the dynamic nature of such list items, they can vary in size (e.g., have different sizes). For purposes of illustration, vertical size is often used in examples because the list items can have different vertical sizes, and lists are often scrolled in a vertical direction (e.g., up and down). However, the technologies can equally be applied to horizontal situations, vertical-horizontal scrolling combinations, or scrolling in other multiple dimensions. Scrolling in both space and time (e.g., virtual time) can be supported by applying the technologies described herein.

The list items can take the form of a very large data set. For example, 10,000, 100,000, 1,000,000, or more items can be supported without degradation of performance during scrolling. Such large data sets typically cannot be supported using approaches that attempt to actively manage the total list items during scrolling.

As described herein, the list items can be displayed as part of a webpage, webview (e.g., rendered HTML), or the like.

Example 7

Exemplary Actively Laid Out Representation of Renderable List Items

In any of the examples herein, reference can be made to an actively laid out representation of renderable list items. Such a representation is typically maintained as part of a rendering engine to account for where on the user interface represented items should appear. For example, as items are laid out on the page, they typically do not overlap. Therefore, a second item that follows a first item can be placed at a location immediately after (e.g., the pixels following) the first item.

List items can be referred to as being "in" the actively laid out representation. For example, a node in the representation can contain a list item or a reference to its content. Items can also be removed from the actively laid out representation. As described herein, the actively laid out representation can represent a proper subset of the total renderable list items.

Due to a variety of factors, such as cascading style sheets, different fonts, differing screen sizes, zoom levels, active content, and the like, lay out can become a resource intensive process, especially when a large number of items are involved. Accordingly, attempting to actively lay out a large data set during scrolling can lead to unacceptable performance degradation.

In practice, such an actively laid out representation can take the form of a Document Object Model ("DOM"). As the number of nodes in the DOM grows, performance begins to suffer. As described herein, the technologies can effectively maintain a substantially constant number of nodes or effectively enforce a ceiling on the number of nodes in the DOM. Accordingly, acceptable performance can be implemented, regardless of the number of list items in the data set.

Actual displaying of the list items in the actively laid out representation can be performed according to which of (and in some cases, what portions of) the list items are within the viewport (e.g., of a display of a hardware device).

Example 8

Exemplary Update of Actively Laid Out Representation of Renderable List Items In any of the examples herein, the actively laid out representation of renderable list items can be updated in response to determining that given conditions are met. For example, updating can be performed responsive to determining that remaining renderable items in the actively managed renderable representation are becoming depleted. Alternatively, updating can be performed responsive to determining that renderable items in the actively managed renderable representation are becoming excessive.

An out-of-bounds condition can be monitored to determine when too few or too many renderable items are present. As described herein, a page unit mechanism can be used by which a target constant number of page units is maintained. Updates can then be triggered based on the status of the page units.

Example 9

Exemplary Determination of Size

In any of the examples herein, the determination of a size of a renderable list item can be performed. Such information can then be used to determine how to adjust placeholders as described herein. Such size is an indication of the amount of screen real estate (e.g., pixels) that the list item will occupy (e.g., in a vertical direction, horizontal direction, or the like) when rendered.

For performance reasons, repeated calculations of a size of a renderable list item can be avoided. For example, a list item can be placed into a test container, where its size can be calculated and stored as associated with the list item.

In practice, such size testing can take place before the item is actually rendered in the user interface. The size testing can be performed on the fly during management of the actively laid out representation, or size testing can be pre-calculated and stored as associated with the list item (e.g., in a server providing the list item).

The sizes of list items can be measured by placing a given list item in a temporary rendering container that is not visible.

In some cases, size can be re-calculated or calculated more than once. For example, different sizes might be stored for a portrait versus landscape rendering on a mobile device, different style sheets, or the like.

Example 10

Exemplary Dummy Placeholders

In any of the examples herein, one or more dummy placeholders can be implemented in the actively laid out representation of the list items to represent list items not actually present in the actively laid out representation. A size can be associated with the dummy placeholder so that it occupies a desired size (e.g., the combined size of the list items represented) in the layout of the list items. The dummy placeholder can be devoid of actual content or have very simple content, thus relieving the rendering engine from having to expend excess processing time determining how to lay out content associated with the dummy placeholder.

The placeholder thus represents list items not actually present in the actively laid out representation of the list items.

In a markup implementation, an exemplary implementation of a dummy placeholder can take the form of a division or section (e.g., an HTML DIV that simply specifies a height) immediately before or after the list items. Height can be specified in pixels or other appropriate units.

Occupying space vacated by list items moved out of the actively laid out representation can comprise growing the dummy place holder by a size equal to a combined size of the list items moved out.

Example 11

Exemplary System Managing Actively Laid Out Representation of Items

Figure 3:
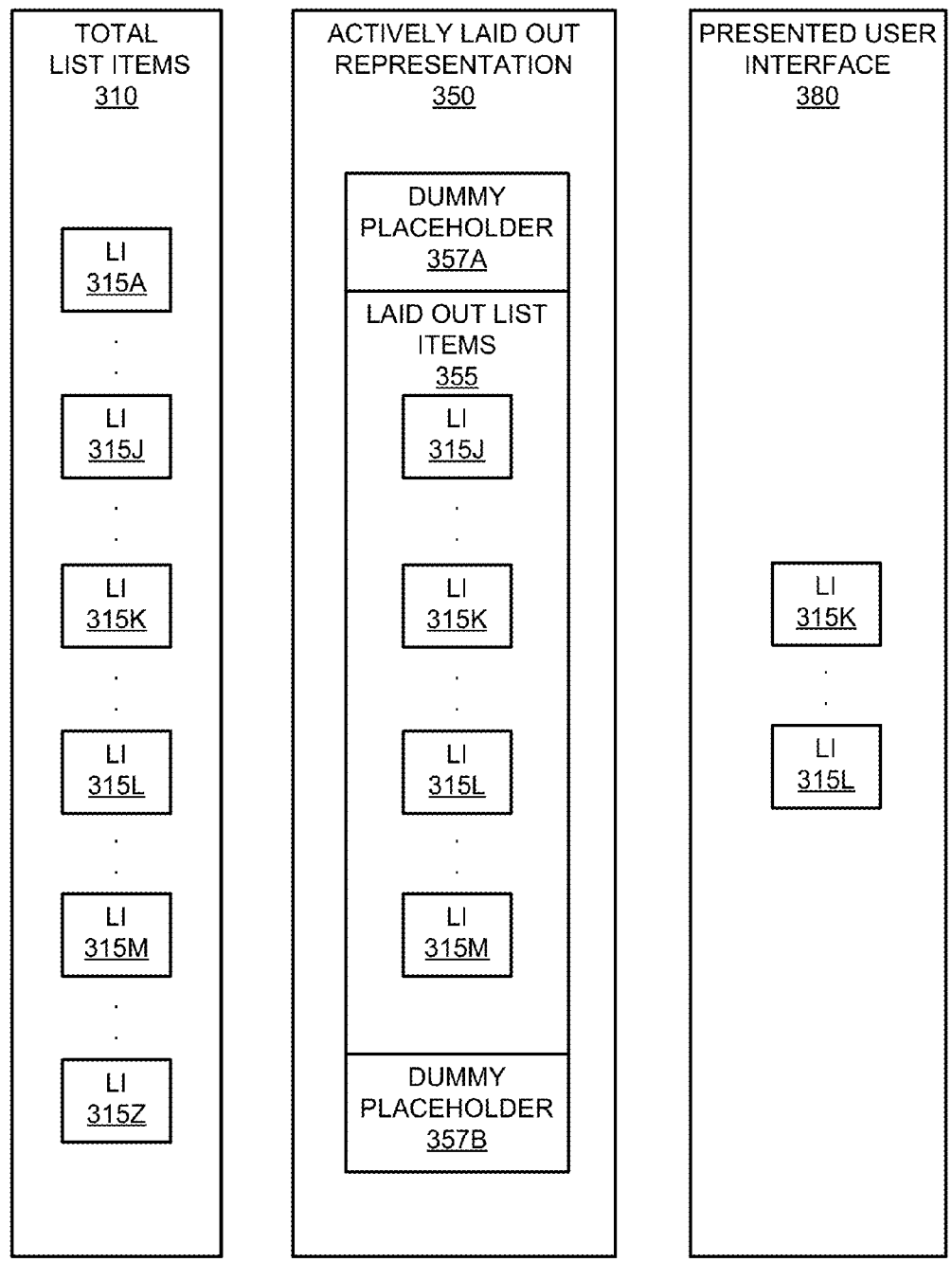
FIG. 3 is a block diagram of an exemplary system managing an actively laid out representation of list items.

FIG. 3 is a block diagram of an exemplary system 300 managing an actively laid out representation of list items. As shown, the actively laid out representation 350 contains a proper subset 355J-M of the list items out of the total list items 310, 315A-Z. Out of the list items in the actively laid out representation 350, a proper subset 315K-L are actually rendered as part of a presented user interface 380. Thus, not all of the total list items 310 are displayed at any given time.

For the sake of convenience, like reference numbers are used for the list items regardless of their location; however, in practice, list items can be stored differently depending on their role. For example, a list item can first be stored as content data in the total list items 310, but, when actually rendered as part of a user interface 380, a list item can be represented as a set of pixels.

For purposes of explanation, it can be said that some of the total list items 310 are currently not in the actively laid out representation 350. Such list items can be 315A through the list item immediately before 315J along with the list item immediately after 315M through the list item 315Z. In practice, some of the sets can be empty or the same (e.g., when scrolling begins, the first item in the laid out list items 355 can be the same as the first item in the total list items 310).

Similarly, some of the actively laid out list items 355 (e.g., 315J and 315M) are currently not rendered in the presented user interface 380 as shown.

As described herein, dummy placeholders 357A,B can be managed to keep the actively laid out representation 350 of the total list items 310 at an apparent same size as the total list items 310. Thus, the subset of the renderable list items that actually is displayed is displayed as being at a correct position in the total list. For example, a scroll box or other scroll position indicator will be at a proper location associated with a current scroll position in the total list.

Example 12

Exemplary Method Managing an Actively Laid Out Representation

Figure 4:
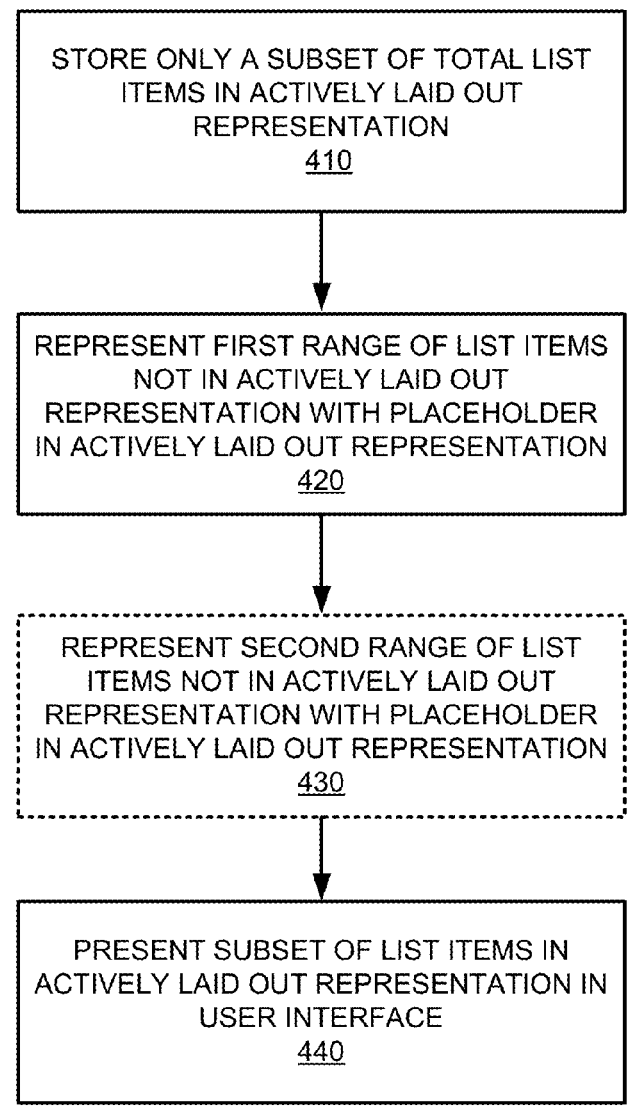
FIG. 4 is a flowchart of an exemplary method of managing an actively laid out representation of list items.

FIG. 4 is a flowchart of an exemplary method 400 of managing an actively laid out representation of list items and can be implemented, for example, via the system shown in FIG. 3.

At 410, only a proper subset of the total list items are stored in an actively laid out representation of the list items.

At 420, a first range of list items not in the actively laid out representation are represented with a placeholder in the actively laid out representation.

At 430, a second range of list items not in the actively laid out representation are represented with a second placeholder in the actively laid out representation. As described herein, a second placeholder may not be necessary (or have a size of zero) in some situations (e.g., when viewing the beginning of a list of items).

At 440, a proper subset of the list items in the actively laid out representation (e.g., the list items in a viewport of a device) are presented (e.g., rendered) in a user interface. In the user interface, the list items can occupy different amounts of space depending on their rendered size.

Example 13

Exemplary Indication to Scroll

In any of the examples herein, an indication to scroll can be received as a scroll event or the like. In practice, it may be desirable to wait until a user has stopped scrolling before updating the actively laid out representation of the list items.

Further, to maintain a visually pleasing appearance, it may be desirable to periodically check if it is an appropriate time to scroll (e.g., when an animation frame is available or the like). So, instead of reacting to scrolling events directly, it may be desirable to note such events and then react when the timing is appropriate.

To avoid excessive updating, displaying, updating, or both can be deferred until after scrolling (e.g., scrolling gestures, scrolling movement, or the like) stops for a threshold time period (e.g., about half a second, 400 milliseconds, or so). The last scroll time can be monitored to determine the last time scrolling occurred.

To avoid animation artifacts or jumpy scrolling, communication between the rendering engine (e.g., browser) and the scroll list view manager can be performed. For example, the scroll list view manager can be notified when the next animation frame is available, and the scroll list view manager can respond if there is any processing to perform (e.g., update the actively laid out representation, show scrolling, animate, or the like).

Example 14

Exemplary Unavailable Data

In any of the examples herein, a user may scroll to a location within the list items where list items are not yet available (e.g., they are not yet in the actively laid out representation). In such a case, a visual representation of the missing items can still be presented to give the user the impression that scrolling is continuing to function properly. For example, a checkerboard pattern or other graphic can be portrayed in the user interface as being scrolled.

Subsequently, when the user stops scrolling or the list items otherwise become available, the actual list items can be rendered in place of the checkerboard pattern.

Example 15

Exemplary System Implementing Infinite Scrolling Via Page Units

Figure 5:
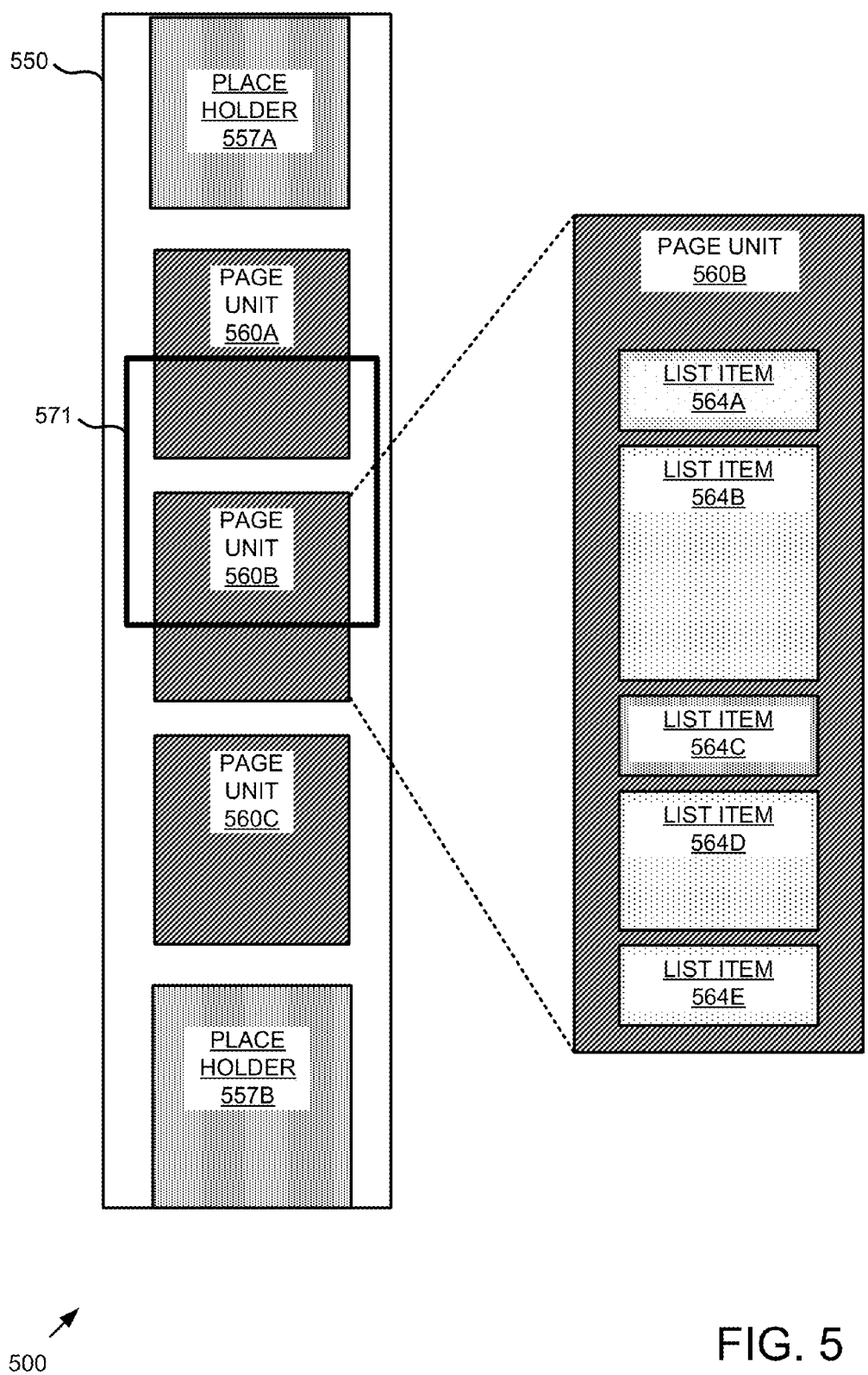
FIG. 5 is a block diagram of an exemplary system implementing infinite scrolling of a very large data set via page units.

FIG. 5 is a block diagram of an exemplary system 500 implementing infinite scrolling of a very large data set via page units. In the example, an actively laid out representation of list items 550 contains a proper subset of total renderable list items (not shown) that are distributed throughout the page units 560A-C. Because the list items (e.g., list items 564A-E) are associated with particular pages (e.g., page unit 560B), they are sometimes called "page items." For sake of simplicity, page units are sometimes called "pages."

In practice, the number of list items 564A-E on a page unit 560B can be chosen so that the size of the page unit 560B is approximately equal to that of the viewport 571. Thus, the number of list items on a particular page unit 560B can vary, depending on the size of the list items contained therein. Although other approaches can be used, a constant number of page units 560A-C can then be maintained as scrolling proceeds throughout the list items. In the example, three page units are maintained (e.g., a current page, a prior page, and a subsequent page). List items before the first page 560A need not be stored in the actively laid out representation 550 and are instead represented by a dummy placeholder 557A. Similarly, list items after the last page 560C need not be stored in the actively laid out representation 550 and are instead represented by the dummy placeholder 557B.

As scrolling proceeds, page units can be discarded or added according to whether further list items are needed or excess list items are being stored.

In a markup representation of list items, page units can be represented as respective markup divisions or sections (e.g., a DIV in the actively laid out representation. Such divisions or sections can be evacuated or moved into the actively laid out representation of the list items, thereby moving groups of list items ("page items") in and out as appropriate.

As shown, the list items rendered in a viewport 571 can be drawn from different page units 560A, 560B. As scrolling proceeds, a page unit 560A may become superfluous. At some point, the page unit 560A can then be removed from the actively laid out representation 550.

Example 16

Exemplary Method Implementing Infinite Scrolling Via Page Units

Figure 6:
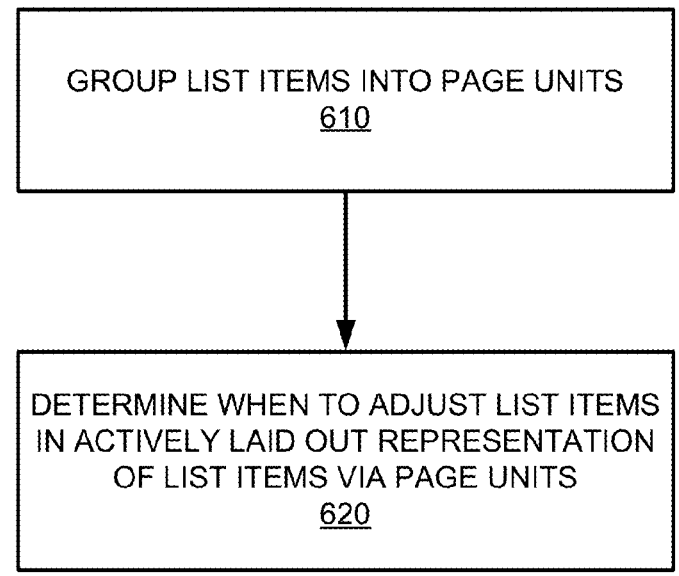
FIG. 6 is a flowchart of an exemplary method of implementing infinite scrolling of a very large data set via page units.

FIG. 6 is a flowchart of an exemplary method 600 of implementing infinite scrolling of a very large data set via page units and can be implemented, for example, via the system shown in FIG. 5.

The renderable list items in the actively laid out representation of the renderable list items can be maintained in a set of consecutive page units. The renderable list items in the actively managed renderable representation can be limited to those renderable list items in the page units.

At 610, the list items are grouped into consecutive page units. For example, as described herein, the list items can be placed on a page unit until the page unit reaches a certain threshold size (e.g., the viewport size).

At 620, it can be determined when to adjust the number of list items in the actively laid out representation of list items via the page units. For example, the number of page units can be maintained constant. Thus, when list items at a last page unit are becoming depleted due to downward scrolling, a new page unit can be added to the bottom of the page units. Accordingly, the top page unit can be discarded (e.g., the page unit is discarded from the actively laid out representation, and so are the associated list items).

In practice, rather than keeping the page units constant to a particular number, a range of numbers can be used (e.g., 3-5 pages or the like).

As the page units are added and removed, the sizes of any dummy placeholders can also be updated. In some cases, the placeholders will fall within a range of sizes during scrolling because as some page units are added, others are removed.

Example 17

Exemplary Evacuation of List Items and Page Units

In any of the examples herein, a determination of when to evacuate (e.g., move out) list items or page units that contain list items can be implemented as appropriate to remove list items that are no longer being displayed. In the case of a page unit, it can be described as an unbreakable blob of list items. After all the list items in the page are out of the viewport larger than a threshold distance, the page can be removed from the actively laid out representation (e.g., put back in the total list items). So, for example, if a given page is more than x (e.g., three, four, or the like) page-heights below the viewport, so that it will still be invisible even if the user scrolls for a full x page-height, then it can be removed from the actively laid out representation.

Evacuation can be to a device's memory (e.g., the total list items), or items in the page can be moved into the cloud as described herein.

As one page is evacuated, another page can be moved in (e.g., immediately, queued, or the like) as described herein.

Example 18

Exemplary Infinite Scrolling Via Remote Storage of List Items

Figure 7:
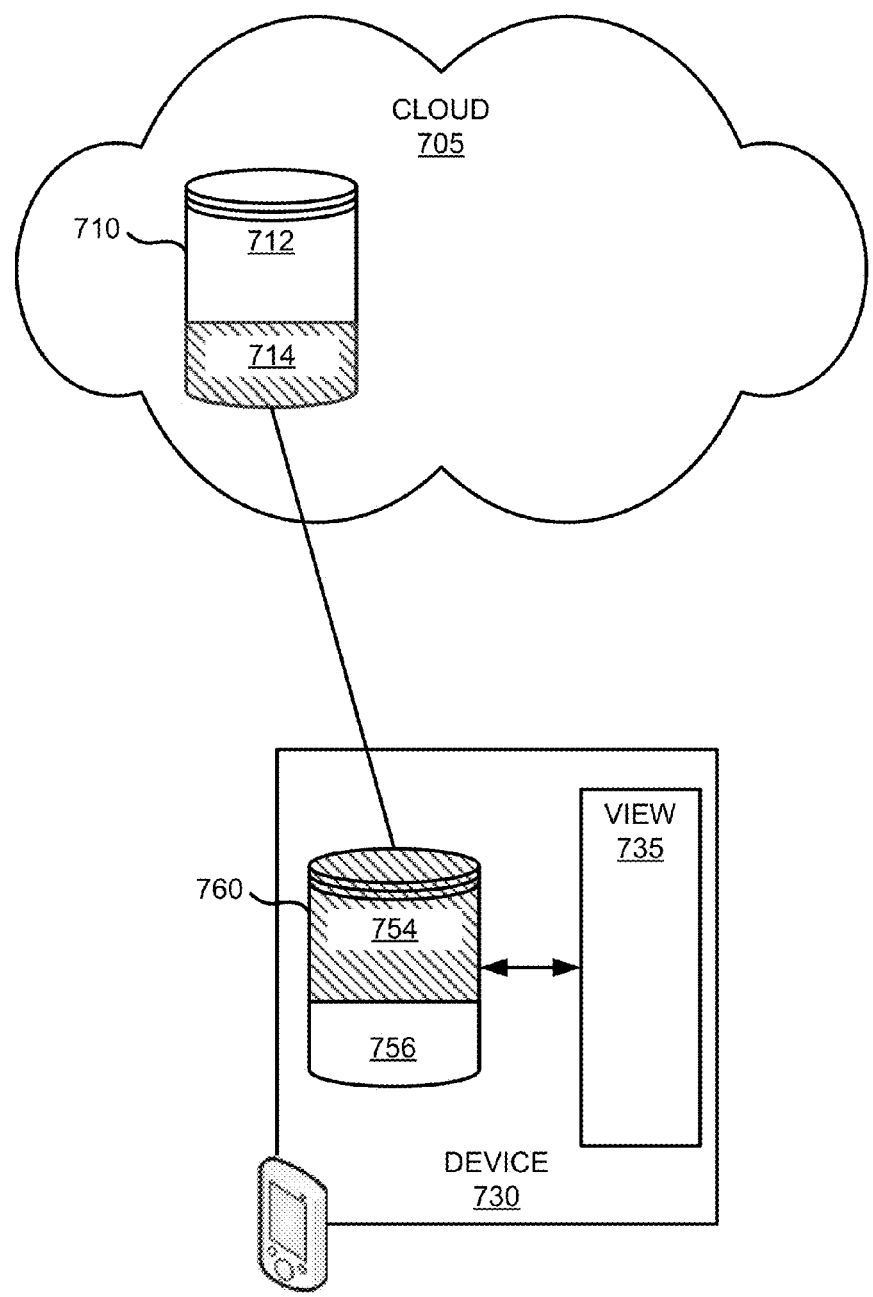
FIG. 7 is a block diagram of an exemplary system implementing infinite scrolling of a very large data set via remote storage of list items.

FIG. 7 is a block diagram of an exemplary system 700 implementing infinite scrolling of a very large data set via remote storage of list items. In the example, instead of storing the total list items locally at the device 730, list items 710 can be stored in the cloud (e.g., by a server).

Some of the list items 712 need not yet be loaded at the device 730. Instead, metadata for the list items (e.g., their size) can be stored at the device 730. Synchronization between the list items 714 in the cloud 705 and the list items 754 at the device can be achieved.

Out of the list items 760 stored at the device 730, some of them 756 can be actively laid out as described herein. Of those, some are presented in the viewport 735.

Example 19

Exemplary Infinite Scrolling Via Remote Storage of List Items Method

Figure 8:
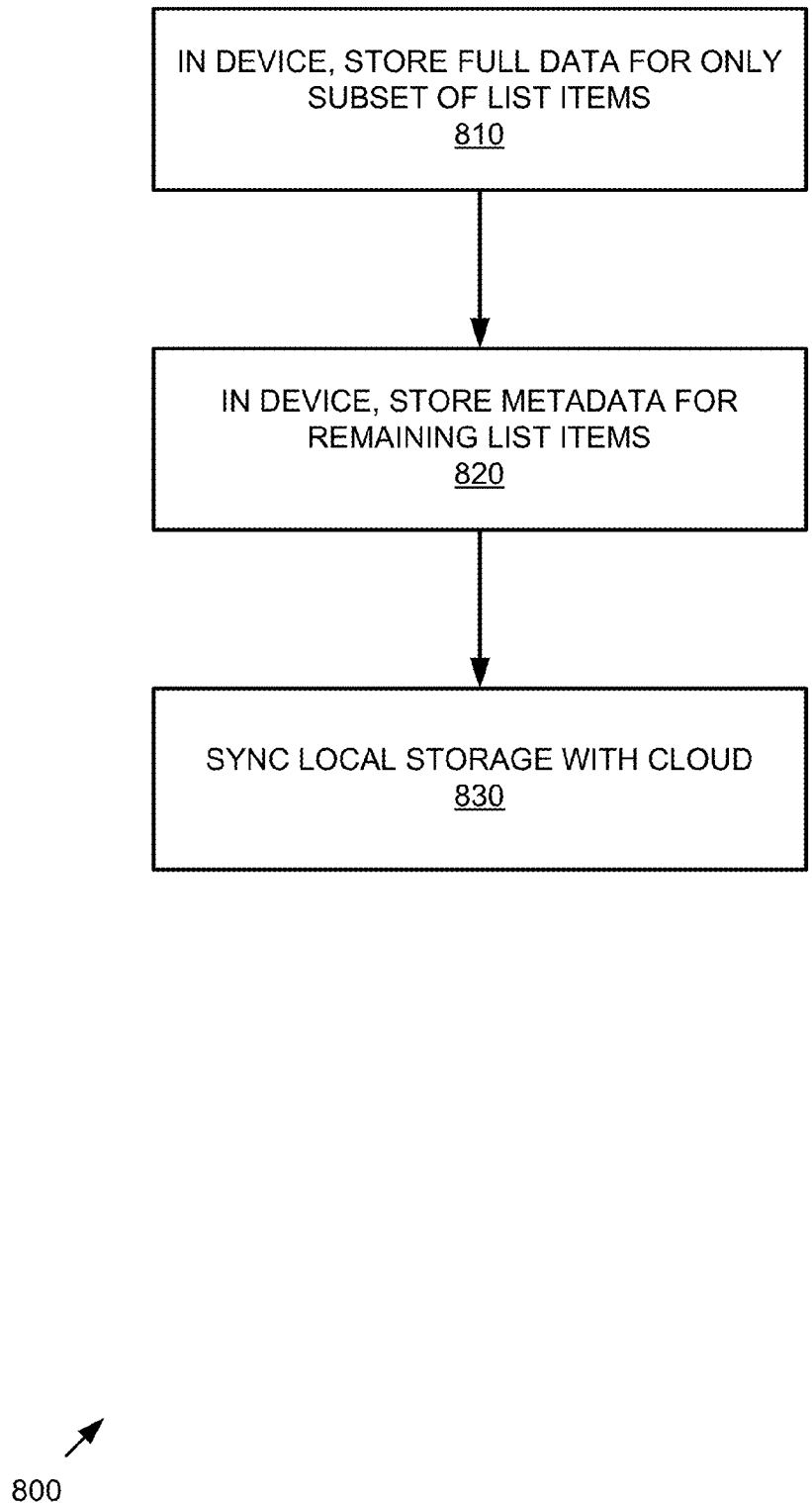
FIG. 8 is a flowchart of an exemplary method of infinite scrolling of a very large data set via remote storage of list items.

FIG. 8 is a flowchart of an exemplary method 800 of infinite scrolling of a very large data set via remote storage of list items and can be implemented, for example, in a system such as that of FIG. 7.

List items stored at a local device can be synchronized with a remote storage, and metadata for list items not locally stored can be maintained.

At 810, full data for only a subset of the total list items is stored in the device that is displaying the list items for scrolling.

At 820, metadata (e.g., size) for the remaining list items is stored in the device.

At 830, local storage of list items is synchronized with those list items in the cloud.

Example 20

Exemplary Execution of Technologies

One implementation of the technologies stores page units as markup language DIVs in HTML. The actively laid out representation of the list items takes the form of a document object model ("DOM"). The total list items are referred to as being in a cache.

The document object model comprises the plurality of markup language DIVs comprising respective portions (e.g., page units) of the subset of total renderable list items. A scroll list view manager can then add DIVs containing additional renderable list items out of the total renderable list items to the document object model when scrolling causes depletion. Some DIVs already in the document object model can be removed (e.g., before, after, or during adding of the added DIVs).

There is a guideline maximum number of items that a page can hold (e.g., the total height of the items is roughly equal to the height of the viewport or an integer multiple of the viewport height, which can be adjusted).

As the user scrolls up and down, the number of active pages remains constant. For example, when scrolling down, if a new page is supposed to enter into the viewport (e.g., the dummy place holder is about to be visible), an active page from the top is removed from the DOM and cached into the memory, and the page to be appended is retrieved from the cache and added after the last active item. The height of the bottom dummy container is decreased by the height of the added page, and the height of the top dummy container is increased by the height of the removed page.

FIGS. 9, 10, and 11 are snapshots of elements in an actively laid out representation of list items during execution of the technologies that demonstrate operation. In FIG. 9, pages 0, 1, and 2 are in the DOM. In FIG. 10, pages 1, 2, and 3 are in the DOM (i.e., page 0 has been moved out, and page 3 has been moved in). In FIG. 11, pages 10, 11, and 12 are in the DOM.

Example 21

Exemplary Object-Oriented Implementation

In any of the examples herein, an object-oriented approach can be taken. In practice, object-oriented functionality can be deprecated at runtime for performance reasons.

A ScrollListView object manages the scrolling operation. The ScrollListView can contain an adjustable number of active pages and two dummy placeholders. A page contains PageItems of varying height.

The objects can have the following prototype methods and attributes:

PageItem
  el: {DOMNode}
  height: {Integer}
    (the height of the PageItem can be calculated only once, and reused afterwards)
Page (contains zero or more PageItems)
  id: {Integer}
  height: {Integer}
  isFull( ): {returns true if the page cannot have further items}
ScrollListView
  (ideally contains constant number (three) Pages and two dummy placeholders for height adjustment)
  pages: [Page],
  attachedPages: Dictionary<id, Page>
  addItem({PageItem}): adds the pageItem to the proper page. If the page does not exist, creates one and registers to itself. Decides whether to show the page by attaching it to the DOM, or just caching it offline.

In one implementation, 10,000 items were scrolled without performance degradation on a fourth generation iPod device. Without the described technologies, the same application froze and crashed.

Example 22

Exemplary Remote Implementation

The cache implementation can be proxied to a remote cloud/cache datastore while storing a sufficient amount of pages in the local cache, and items from the remote cloud datastore can be gathered into the cache. Thus, millions of nodes can be scrolled without degradation in performance.

Caching out-of-the-viewport DOM nodes offline, without attaching it to the page dramatically and positively affects the application's responsiveness; however, the application will still continue to consume more and more memory as more items are added to the ScrollListView. The memory usage can be optimized by extending part of the cache into the cloud.

The device can connect to a remote cloud data store to persist part of its data that it will not be using in the short term.

The cloud cache can have two remote interfaces: one to get the metadata only (e.g., to adjust the top and bottom height of the containers) and a second interface to retrieve the real data. Thus, the local cache will be retrieving "will be required" (e.g., upcoming pages below the viewport while scrolling down) data from the cloud cache, and it will be putting/discarding data that "will not be needed any further" (e.g., top pages that are gone out of the viewport while scrolling down).

The remote cache implementation can include a way to serialize and deserialize DOM nodes because a DOM object typically cannot be stored directly into the cloud. For example, innerHTML of the nodes can be stored.

How much the application can use the remote cache can be adjustable; so the client can opt not to use any cloud cache at all and render and scroll what is available locally. Or, to the other extreme, the client can discard anything local and retrieve the next pages from the remote store as the user scrolls (e.g., the client will know the total height of the upcoming pages and adjust the top and bottom dummy container heights according while scrolling; whereas it will have no idea what will be the contents of those pages until retrieving them from the cloud).

The remote cache can be an extension. The local cache can be a façade/proxy. From the ScrollListView's perspective, the operations can appear as if they were happening on the local device. Because the ScrollListView will be querying the local cache, the extended cache will not require any change or refactoring in the ScrollListView's implementation. It simply defines the endpoints and tells the local cache to keep in sync with the cloud.

Example 23

Exemplary Advantages and Enhancements

Simply adding more and more items to the actively laid out representation of the list items will eventually result in scrolling behavior slowing down; screen freezing and the view being totally unresponsive for prolonged periods; and jumpy behavior due to skipping of frame(s) while scrolling. Such behavior can be because the device is trying to repaint or reflow a very large DOM structure with hundreds of thousands of nodes. As described herein, such problems can be avoided by moving items out of the DOM.

Thus, items can be moved in and out while scrolling (e.g., remove top and bottom portions of the list that are not visible to the user (within the viewport) and lay out or render only the visible part).

Using an onscroll event to decide when to re-render parts of the page may not be ideal. A requestanimationframe feature can be used to better advantage.

To avoid excessive reflows, object dimensions can be calculated once and cached values used during scroll events.

The solution can be adaptive by using larger (e.g., higher) pages, larger numbers of pages, and higher numbers of DOM nodes in high-end devices and more conservative parameters in lower-end devices.

If the user agent is single-threaded, it can be challenging to render user interface while scrolling. Rendering can be deferred until scroll events complete.

There can be some pre-rendered buffer region above and below the viewport as shown herein. So, the user will not realize the content has not been put in the DOM yet. The user need not realize that content is being pulled in and out of the DOM because such activity affects regions outside of the viewport.

If the user scrolls past the buffered region, a blank DIV (e.g., with checkerboard pattern) can be rendered and then filled after the user stops scrolling.

The height of a list item to be added to the actively laid out representation can be known a priori. For example, the offset height of an item can be calculated once (e.g., using a hidden container) and cached in a structure. Such an approach can perform better than querying the offsetheight of the page when a new item is added.

Another enhancement is ensuring that list items are of the same height. So, if an item is too high, the bottom of it can be cropped so that the user sees partial content. An indication of truncation (e.g., ellipsis or partial characters) can be provided. For example, a usesEqualHeights flag can be implemented in the ListViewManager, resulting in enhanced performance because height calculations are avoided (e.g., test containers to measure dimensions are no longer needed).

Another enhancement is to embed the dimensions of the list into markup, such as:

<div id="container001" data-height="300" data width="300">content here </div>

So, with minimal help from the server, the implementation can be significantly faster.

Calculating the top offset of a page (e.g., pageYOffset, scrollTop) can be expensive because it can also trigger reflow. So, such values can be cached when not doing any rendering (e.g., while scrolling), and the cached values can be used in a render loop.

To achieve a smooth experience (e.g., near 60 frames per second), operation in an animation frame (e.g., the allocated time to do the rendering) can leave about 16 milliseconds per frame.

Event handling can be delegated because event handling in a large set of items can be problematic.

Example 24

Exemplary Versatility

The technologies described herein can be implemented in JavaScript and HTML (e.g., HTML 5 or the like) environments across different platforms (e.g., across iOS devices, Microsoft Windows Phone devices, Android devices, and the like).

Because the technologies can make use of commonly-available markup conventions and APIs, they can be easily supported across a wide variety of devices. The implementation can thus be framework-agnostic and does not require any special library or framework to be used.

Further, the implementation can degrade gracefully. So, for example, if requestanimationframe is not supported, a setInterval can be used.

The technologies can be implemented in an environment supporting legacy DOM APIs (e.g., the standard DOM Level 1 API), which is fully supported in almost all existing user agents. Thus, communication with the DOM can be accomplished with the legacy DOM API. So, if a newer or optimized method or API does not exist, there are older, yet acceptable alternatives that permit graceful degradation.

Developers wishing to use native features of a device can implement a hybrid application that uses native features but includes a webview that supports traditional HTML, JavaScript, or the like. Accordingly, the hybrid application can take advantage of the technologies described herein (e.g., scrolling within the webview can be accomplished as described herein).

Example 25

Exemplary Computing Systems

Figure 12:
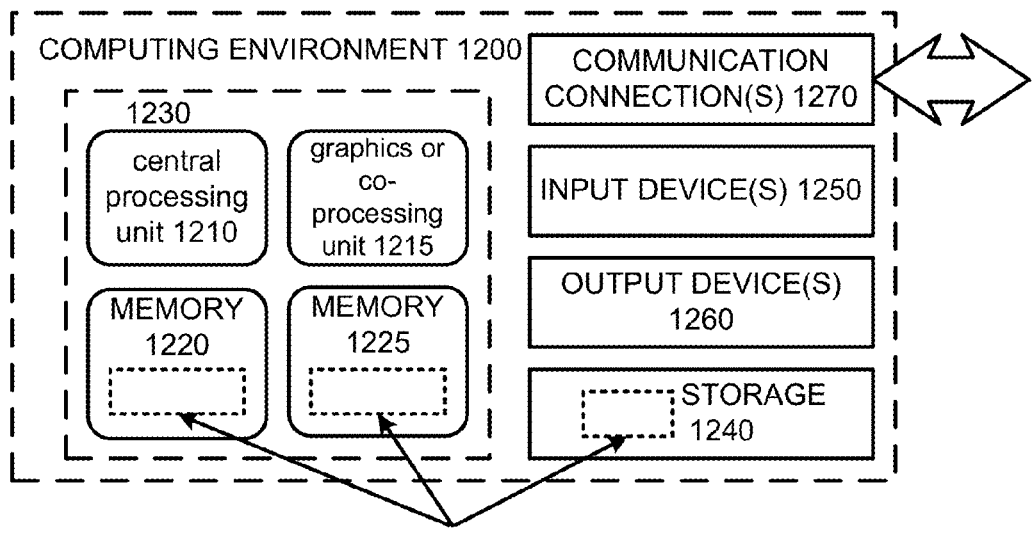
FIG. 12 is a diagram of an exemplary computing system in which described embodiments can be implemented.
Figure 13:
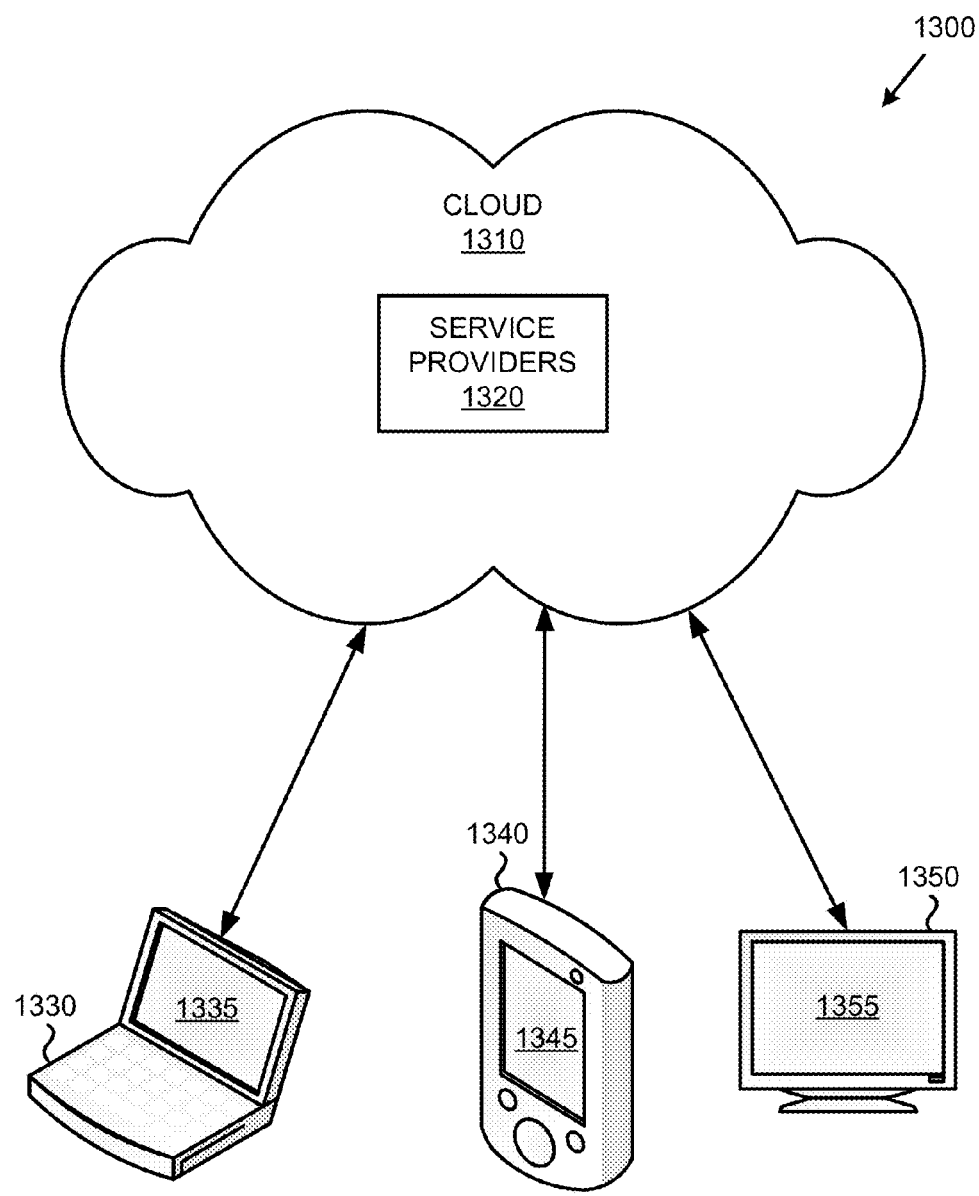
FIG. 13 is an exemplary cloud-support environment that can be used in conjunction with the technologies described herein.

FIG. 12 illustrates a generalized example of a suitable computing environment or system 1200 in which several of the described innovations may be implemented. The computing system 1200 is not intended to suggest any limitation as to scope of use or functionality, as the innovations may be implemented in diverse general-purpose or special-purpose computing systems.

With reference to FIG. 12, the computing system 1200 includes one or more processing units 1210, 1215 and memory 1220, 1225. In FIG. 12, this basic configuration 1230 is included within a dashed line. The processing units 1210, 1215 execute computer-executable instructions. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 12 shows a central processing unit 1210 as well as a graphics processing unit or co-processing unit 1215. The tangible memory 1220, 1225 may be volatile memory (e.g., registers, cache, RAM), non-volatile memory (e.g., ROM, EEPROM, flash memory, etc.), or some combination of the two, accessible by the processing unit(s). The memory 1220, 1225 stores software 1280 implementing one or more innovations described herein, in the form of computer-executable instructions suitable for execution by the processing unit(s).

A computing system may have additional features. For example, the computing system 1200 includes storage 1240, one or more input devices 1250, one or more output devices 1260, and one or more communication connections 1270. An interconnection mechanism (not shown) such as a bus, controller, or network interconnects the components of the computing system 1200. Typically, operating system software (not shown) provides an operating environment for other software executing in the computing system 1200, and coordinates activities of the components of the computing system 1200.

The tangible storage 1240 may be removable or non-removable, and includes magnetic disks, magnetic tapes or cassettes, CD-ROMs, DVDs, or any other medium which can be used to store information in a non-transitory way and which can be accessed within the computing system 1200. The storage 1240 stores instructions for the software 1280 implementing one or more innovations described herein.

The input device(s) 1250 may be a touch input device such as a keyboard, mouse, pen, or trackball, a voice input device, a scanning device, or another device that provides input to the computing system 1200. For video encoding, the input device(s) 1250 may be a camera, video card, TV tuner card, or similar device that accepts video input in analog or digital form, or a CD-ROM or CD-RW that reads video samples into the computing system 1200. The output device(s) 1260 may be a display, printer, speaker, CD-writer, or another device that provides output from the computing system 1200.

The communication connection(s) 1270 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor (e.g., which is ultimately implemented in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 26

Exemplary Cloud-Supported Environment

In example environment 1300, the cloud 1310 provides services for connected devices 1330, 1340, 1350 with a variety of screen capabilities. Connected device 1330 represents a device with a computer screen 1335 (e.g., a mid-size screen). For example, connected device 1330 could be a personal computer such as desktop computer, laptop, notebook, netbook, or the like. Connected device 1340 represents a device with a mobile device screen 1345 (e.g., a small size screen). For example, connected device 1340 could be a mobile phone, smart phone, personal digital assistant, tablet computer, and the like. Connected device 1350 represents a device with a large screen 1355. For example, connected device 1350 could be a television screen (e.g., a smart television) or another device connected to a television (e.g., a set-top box or gaming console) or the like. One or more of the connected devices 1330, 1340, 1350 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1300. For example, the cloud 1310 can provide services for one or more computers (e.g., server computers) without displays.

Services can be provided by the cloud 1310 through service providers 1320, or through other providers of online services (not depicted). For example, cloud services can be customized to the screen size, display capability, and/or touch screen capability of a particular connected device (e.g., connected devices 1330, 1340, 1350).

In example environment 1300, the cloud 1310 provides the technologies and solutions described herein to the various connected devices 1330, 1340, 1350 using, at least in part, the service providers 1320. For example, the service providers 1320 can provide a centralized solution for various cloud-based services. The service providers 1320 can manage service subscriptions for users and/or devices (e.g., for the connected devices 1330, 1340, 1350 and/or their respective users).

Example 27

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

ALTERNATIVES

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

I claim:

1. A method implemented by one or more computer processors, the method comprising:
receiving an indication to scroll a displayed list of renderable list items out of a total renderable list items, wherein the displayed list is presented in a user interface of a computing device;
responsive to the indication to scroll, updating, by the computing device, which of the total renderable list items are maintained in an actively laid out representation of the renderable list items, wherein the updating comprises removing one or more of the renderable list items from the actively laid out representation of the renderable list items, wherein the actively laid out representation of the renderable list items comprises a dummy placeholder at an end of the actively laid out representation; and
adjusting, by the computing device, the dummy placeholder at the end of the actively laid out representation, wherein the adjusting comprises occupying space vacated by the one or more renderable list items removed from the actively laid out representation of the renderable list items by increasing a size of the dummy placeholder at the end of the actively laid out representation by a combined size of the one or more removed renderable list items.

2. The method of claim 1 wherein:
the actively laid out representation of the renderable list items comprises a document object model representing the renderable list items of the actively laid out representation of the renderable list items.

3. The method of claim 2 wherein:
communication with the document object model is accomplished with a legacy domain object model API.

4. The method of claim 1 further comprising:
displaying a subset of the renderable list items and the dummy placeholder in the actively laid out representation of the list items such that a scroll position indicator of the user interface provides a visual cue as to a relative location of the subset of renderable list items within the total renderable list items.

5. The method of claim 1 further comprising:
deferring updating until after scrolling stops for a threshold time period.

6. The method of claim 1 further comprising:
further responsive to the indication to scroll, moving a plurality of renderable list items from the total renderable list items into the actively laid out representation of the renderable list items.

7. The method of claim 6 wherein:
the plurality of the renderable list items is moved into the actively laid out representation of the renderable list items responsive to determining that remaining renderable items in the actively managed renderable representation are becoming depleted due to scrolling.

8. The method of claim 1 further comprising:
maintaining the renderable list items in the actively laid out representation of the renderable list items in a set of consecutive page units; and
limiting the renderable list items in the actively laid out representation to those renderable list items in the page units.

9. The method of claim 8 further comprising:
maintaining a constant number of page units in the actively laid out representation.

10. A method implemented by one or more computer processors, the method comprising:
receiving an indication to scroll a displayed list of renderable list items out of a total renderable list items having different sizes, wherein the displayed list is presented in a user interface of a computing device;
responsive to the indication to scroll, updating which of the total renderable list items are maintained in an actively laid out representation of the renderable list items, wherein the updating comprises moving a plurality of the renderable list items out of the actively laid out representation of the renderable list items;
adjusting one or more dummy placeholders, wherein the adjusting comprises occupying space vacated by the renderable list items moved out of the actively laid out representation of the renderable list items with one of the one or more dummy placeholders, wherein the space vacated is equal to a combined size of the plurality of list items moved out;
maintaining the renderable list items in the actively laid out representation of the renderable list items in a set of consecutive page units; and
limiting the renderable list items in the actively laid out representation to those renderable list items in the page units, wherein the page units are represented as respective markup language divisions in the actively laid out representation.

11. The method of claim 10 further comprising:
maintaining a constant number of page units in the actively laid out representation.

12. A method implemented by one or more computer processors, the method comprising:
receiving an indication to scroll a displayed list of renderable list items out of a total renderable list items having different sizes, wherein the displayed list is presented in a user interface of a computing device;
responsive to the indication to scroll, updating which of the total renderable list items are maintained in an actively laid out representation of the renderable list items, wherein the updating comprises moving a plurality of the renderable list items out of the actively laid out representation of the renderable list items;
adjusting one or more dummy placeholders, wherein the adjusting comprises occupying space vacated by the renderable list items moved out of the actively laid out representation of the renderable list items with one of the one or more dummy placeholders, wherein the space vacated is equal to a combined size of the plurality of list items moved out;
maintaining the renderable list items in the actively laid out representation of the renderable list items in a set of consecutive page units;
limiting the renderable list items in the actively laid out representation to those renderable list items in the page units; and
maintaining the dummy placeholder as a markup language division immediately before or after the page units.

13. The method of claim 12 wherein occupying space vacated by the list items moved out comprises growing the dummy placeholder by a size equal to a combined size of the list items moved out.

14. The method of claim 13 further comprising:
measuring sizes of the list items moved out by placing the list items in a temporary container outside of the actively managed renderable representation.

15. The method of claim 13 further comprising:
synchronizing list items locally stored at a local device with a remote storage; and
maintaining metadata for list items not locally stored.

16. A computing system comprising:
memory;
one or more processors;
a scroll list view manager configured to manage a document object model comprising renderable list items, wherein the scroll list view manager maintains a subset of a list of renderable list items in the document object model, a first dummy placeholder representing renderable list items in the list before the subset of the renderable list items in the document object model, and a second dummy placeholder representing list items in the list after the subset of the renderable list items in the document object model.

17. The computing system of claim 16 wherein:
the document object model comprises a plurality of markup language DIVs comprising respective portions of the subset of the list of renderable list items;
the scroll list view manager is further configured to add markup language DIVs containing additional renderable list items out of the list of renderable list items to the document object model when scrolling causes depletion; and
the scroll list view manager is further configured to remove markup language DIVs from the document object model.

18. The computing system of claim 16 wherein:
communication with the document object model is accomplished via a standard DOM Level 1 API.

19. The computing system of claim 16 further comprising:
a webview, wherein renderable list items in a viewport are displayed via the webview.

20. One or more computer-readable devices comprising computer-executable instructions causing a computing system to perform a method comprising:
for a list of consecutive renderable list items having variable visual sizes in a web view, storing only a subset of the renderable list items in the list into a document object model for the web view;
grouping the renderable list items in the actively renderable representation of the web view into different consecutive page units stored as respective divisions in the web view;
maintaining a first dummy placeholder of a first size before the consecutive page units;
maintaining a second dummy placeholder of a second size after the consecutive page units;
displaying at least a portion of the renderable list items in the document object model;
receiving an indication to scroll within the list;
determining that scrolling is causing remaining renderable list items at an end of the document object model in a last of the consecutive page units to become depleted;
responsive to determining that scrolling is causing remaining renderable list items to become depleted, performing (i)-(iv):
(i) moving a plurality of additional renderable list items in the list of consecutive renderable list items into the document object model of the web view,
(ii) shrinking the second dummy placeholder,
(iii) moving a plurality of renderable list items already in the document object model out of the document object model, and
(iv) growing the first dummy placeholder; and
upon completion of scrolling, displaying a different portion of the renderable list items in the document object model.

* * * * *